Nov. 26, 1940.   R. C. STRAUSS   2,222,636
VEHICLE ACCESSORY
Filed April 14, 1937
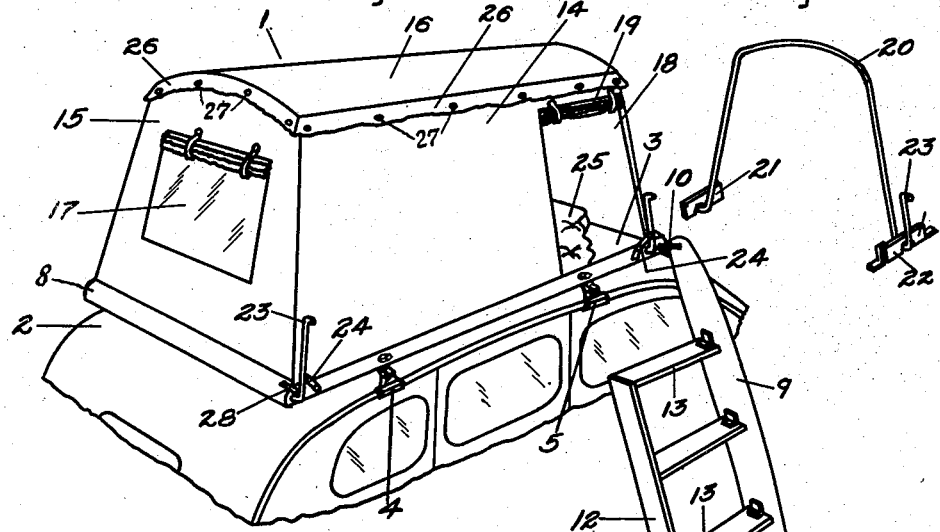
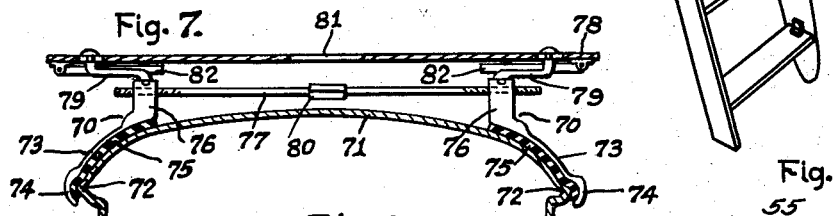
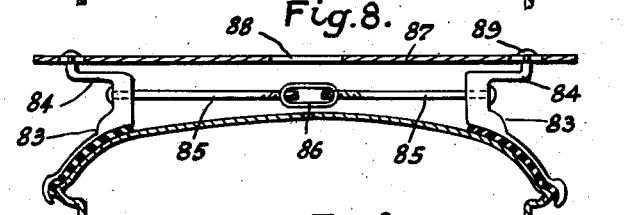
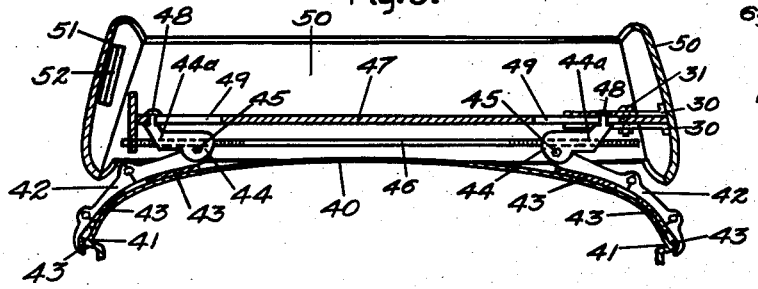
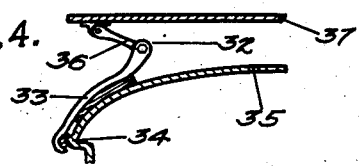
INVENTOR.
Ray C. Strauss
BY
George F. Mueller
ATTORNEY.

Patented Nov. 26, 1940

2,222,636

UNITED STATES PATENT OFFICE 2,222,636

VEHICLE ACCESSORY

Ray C. Strauss, Madison, Wis.

Application April 14, 1937, Serial No. 136,752

17 Claims. (Cl. 135—1)

This invention relates to supporting members and platforms adapted to be removably mounted on the roof of vehicles and to adjustable mounting means adapted to support a platform on the roof of the vehicle.

With the use of the all-steel roof construction in present day motor vehicles, I have found that it is possible to removably mount supporting members or a platform on the roof of such vehicles. The platform may be fitted with a bed and suitable enclosure, or the platform may be used as a luggage carrier, or the platform may be used to support any desired articles on the roof, such as public address speakers, advertising matter, etc., as desired.

My invention provides means for removably securing a platform to the roof of any type of vehicle, the shoulders of which roof are of sufficient strength and rigidity to support such a platform and any articles which it is desired to place on the platform.

My invention further provides a collapsible enclosure mounted on the platform which provides a shelter or tent that may be used as a sleeping compartment.

My invention further provides adjustable supporting members which may be easily mounted or removed from the vehicle roof, the supporting members being adapted to support any desired article.

Other features and advantages of my invention will become apparent from a consideration of the following detailed description, which is to be taken in conjunction with the accompanying drawing, wherein:

Fig. 1 is a perspective view of the upper portion of a conventional type motor vehicle with a bed and shelter removably mounted on the vehicle roof, illustrating one use of the adjustable supporting members and illustrating the shelter in erected or set-up position.

Fig. 2 is a perspective view showing a form of end bow used to erect the shelter.

Fig. 3 is a transverse sectional view of a platform removably mounted on a conventional type vehicle roof, illustrating one form of mounting means.

Fig. 4 is a transverse sectional view of a platform removably mounted on a vehicle roof, illustrating a further form of mounting means.

Figs. 5 and 6 are front views of details illustrating different types of fastening means.

Figs. 7 and 8 are transverse sectional views of platforms removably mounted on a vehicle roof, illustrating further forms of mounting means.

It is apparent from an inspection of the accompanying drawing, that the adjustable supporting members of this invention permits a platform to be mounted on the roof of a vehicle without injuring the roof in any way. Fig. 1 illustrates a shelter 1 removably mounted on the roof 2 of a conventional type motor vehicle. Platform 3, forming the floor of the shelter, is mounted above roof 2 by means of adjustable supporting members which comprise metallic brackets 4 and 5 and adjustable metallic tension members, as will be explained in detail hereinafter. Platform 3 is provided with fixed vertical walls 8 and a removable or hinged wall 9. Wall 9 is preferably hinged to platform 3 at the front end of platform 3 by means of a ball and socket type hinge or swiveled hinge 10, in order to allow wall 9 to be swung outwardly and downwardly. When wall 9 is swung outwardly and downwardly, its rearward end may be placed on the ground. A collapsible ladder 12 is secured to the inner surface of wall 9 and provides a convenient and ready means of access to the platform. The rungs 13 are so proportioned that the ladder 12 may be collapsed tightly against wall 9, as shown in Fig. 3, when the wall is swung upwardly into its closed position. If desired, suitable means may be provided to lock ladder 12 in its collapsed position against wall 9.

Shelter 1 mounted on platform 3 comprises a tent made of suitable material and is provided with inclined or vertical side walls 14, end walls 15 and roof 16. End walls 15 may be provided with a window 17, if desired. The side wall 14 is provided with an opening 18 serving as a means of access to the interior and is provided with a closure curtain 19. The tent is erected and maintained in erected position by means of end bows 20. End bows 20 are journaled in bearings 21 and 22 at opposite ends and are provided with cranks 23. Spring catches 24 are mounted on journals 22 and are adapted to maintain cranks 23 and bows 20 in erected position. If the shelter is used to house a bed, a mattress 25 is disposed on platform 3. Suitable pillows and other bed clothes may be provided, as desired, but form no part of this invention.

When it is desired to travel, the shelter is collapsed by first releasing cranks 23 and dropping them into a horizontal position. Cranks 23 are released by manually releasing spring catches 24. Ladder 12 is collapsed against side wall 9 and the side wall is then swung inwardly and upwardly into its closed position. Side wall 9 is maintained in its closed position by suitable means, such as a spring catch 28. Roof 16 of the shelter is substantially the same size as the opening between the upper edges of the side walls of platform 3 and is provided with flaps 26 which are adapted to be secured to the side walls by suitable means, such as snap fastener 27, buttons or the like. If desired, a separate closure may be provided. The entire shelter, cranks and ladder are completely enclosed. The side walls of the platform may be of any desired height. In this particular example, the walls are of sufficient height so that the bed clothes and other materials are completely enclosed.

Fig. 3 illustrates, in detail, the construction of one form of adjustable supporting member forming the mounting means and a platform made according to my invention. The roof of the vehicle is designated by the numeral 40 and is provided with edge members or sills 41. Brackets 42 are preferably hinged, as shown, whereby the bearing portions or the portions between the hook-like extremities and the head members are flexible to allow them to be adaptable to various shoulder contours. Brackets 42 are held in spaced relation with respect to the surface of the roof by means of suitable shock-absorbing material 43, such as rubber, felt, or the like. Threaded post members 44 are mounted at the inner ends of brackets 42 by means of a pin or bolt 45. A tie rod or tension member 46, threaded at both ends, is threaded into post members 44. The threads on the ends of the tie rods and the threads in the post members are so formed as to permit the cleats to be tightly clamped to the sills 41 by adjustment of the tie rods from one side, that is, the one end of the tie rod is provided with a right hand thread, while the other end is provided with a left hand thread. The end of tie rod 46 adjacent hinged side wall 9 is preferably formed with a square or hexagonal shape, adapted to be gripped by a wrench or suitable crank.

Platform 47 is disposed on post members 44, in spaced relation to roof 40, and is secured to the post members by means of bolts 48. Platform 47 may be provided with elongated slots 49 to accommodate bolts 48 and permit the platform to be centered above the vehicle roof regardless of the width of the roof or the contour of the roof shoulders. Platform 47 is provided with substantially vertical side walls 50 and a hinged side wall 51. Side wall 51 is hinged at its forward end to the platform by means of a ball and socket type hinge or a swiveled hinge, as described herein before in connection with side wall 9 of Figs. 1 and 2. Side walls 50 may be provided with a plurality of pairs of brackets 30 having elongated slots. Bolts 31 are threaded through the slots and registering openings in the platform and serve to fasten the side walls to the platform. The provision of elongated slots permits the side walls to be extended, if desired. A collapsible ladder 52 is mounted on the inner surface of side wall 51.

The provision of the hinged side wall together with the collapsible ladder provides a convenient and ready means of access to the platform. The platform may be used for any desired purpose, such as a luggage carrier, or it may be fitted with a shelter, as described hereinbefore, or it may be used with the conventional type camper's sleeping bag or bed. I prefer to provide brackets 42 with post members or heads 44 having outwardly projecting arms 44a and secure platform 47 to these arms. The pressure applied at the extremity of arms 44a will tend to maintain brackets 42 tightly clamped to the sills 41 of roof 40, according to well known principles of mechanics.

In the construction illustrated in Fig. 4, the platform forms a part of the adjustable supporting member. Brackets 32 are hinged, as shown, the lower arms 33 being adapted to grip sills 34 of roof 35, the upper arms 36 being adapted to be secured to platform 37. That portion of the bracket between the hook-like extremity and the hinge being curved to conform to the contour of the shoulders of the roof. Suitable provisions may be made to lock the upper and lower arms after the platform has been mounted on the roof. The platform 37 serves as the tension member and no separate tie rod or other tension member is required. The pressure applied to the extremities of arms 36 tends to maintain the brackets tightly clamped to the sills 34, according to well known principles of mechanics.

Figs. 5 and 6 illustrate further methods of clamping the brackets to the sill or eaves of a vehicle roof. In Fig. 5, the bracket 55 is shown as being clamped to the vehicle roof 56 which is provided with sill 57. A clamping plate 58 grips the sill 57 and is secured to bracket 55 by means of screw 59. Suitable shock-absorbing material 60 is disposed between bracket 55 and clamping plate 58 and roof 56. If desired, the clamping plate 58 or the end portion of bracket 55 and the clamping plate 58 may be enlarged laterally, as shown in connection with cleats 4 and 5 of Fig. 1.

Fig. 6 illustrates a bracket 61 clamped to a vehicle roof 62 which is provided with eave 63. The end of bracket 61 fits within eave 63 and clamping plate 64 grips eave 63. Clamping plate 64 is secured to bracket 61 by means of screw 65. Suitable shock-absorbing material 66 is disposed between bracket 61 and clamping plate 64 and roof 62. Clamping plate 64 or the end portion of bracket 61 and clamping plate 64 may be enlarged laterally, if desired, as described in connection with clamping plate 58 and bracket 55 of Fig. 5.

The brackets and the clamping plates described may be encased or covered with suitable shock-absorbing material, if desired. Such a covering obviates the necessity of the use of further shock-absorbing material.

Fig. 7 illustrates a further modification of the removable mounting means constructed according to my invention. Brackets 70 are provided with a more or less flexible mid-portion 73 which is adapted to conform to the contour of the curvature of roof 71 when the adjustable supporting member is clamped to the roof. The hook-like extremities 74 are rigid and adapted to grip sills 72. The usual shock-absorbing material 75 is disposed between brackets 70 and roof 71. The enlarged head portions 76 of brackets 70 are threaded to cooperate with tie rod 77, as described in connection with the tie rod of Fig. 3. Platform 78 is mounted on heads 76 by means of arms 79. Arms 79 may be secured to heads 76 by means of screw threads, or any other suitable means. The mid-portion of tie rod 77 is enlarged and squared, or it may be knurled, as indicated at 80, to allow adjustment of the tie rod and to permit the brackets to be securely clamped to the roof 71. Platform 78 is provided with hand holes 81 to allow adjustment of the tie rod without removing the platform from its position. Two or more adjustable supporting members are employed in mounting the platform above the roof of the vehicle.

In the modification of the adjustable supporting member illustrated in Fig. 8, the brackets 83 are provided with integral outwardly projecting arms 84. The bracket is provided with a curved portion which conforms to the contour of the shoulders of the roof. The tension member comprises a pair of rods 85 securely anchored to brackets 83 by suitable means. The free ends of rods 85 are threaded and fitted with a turnbuckle 86. Platform 87 is mounted on arms 84 and secured to the arms by means of screws 89. The platform is provided with hand holes 88 to furnish a means of access to turnbuckle 86, whereby the tension member may be adjusted without removing the platform from its position.

I have found that I may use the metallic supporting members, hereinbefore described, as a radio aerial or I may provide an adjustable supporting member for such use which is independent of a platform. Any of the supporting members, hereinbefore described may be so used, but in cases where it is not desired to use a platform, I prefer to provide a lighter weight construction.

The adjustable supporting members may be used for purposes other than those specifically described and illustrated. For example, one or more supporting members may be secured to a vehicle roof for the purpose of supporting public address system speakers or advertising matter above the roof; two or more supporting members may be secured to a vehicle roof and ladders, skis, or other elongated articles may be supported directly on the tie rods.

It is to be understood that the foregoing description is merely illustrative of my invention and that various modifications may be made without departing from the scope of my invention. For example, the removable platform may be provided with collapsible legs 82 (see Fig. 8) to permit the platform to be set on the ground or other surface.

I claim:

1. An adjustable supporting member adapted to be mounted on the roof of a vehicle comprising a pair of brackets connected by a tension member.

2. An adjustable supporting member adapted to be mounted on the roof of a vehicle comprising a pair of brackets connected by an adjustable member.

3. An adjustable supporting member adapted to be mounted on the roof of a vehicle comprising a pair of brackets and a tension member, said brackets being provided with flexible portions adapted to conform to the contour of the shoulders of said roof.

4. An adjustable supporting member adapted to be mounted on the roof of a vehicle comprising a pair of brackets and a rigid, adjustable tension member, said brackets being provided with flexible portions adapted to conform to the contour of the shoulders of said roof.

5. An adjustable supporting member adapted to be mounted on the roof of a vehicle comprising a pair of brackets and a tension member, said brackets having a curved portion conforming to the contour of the shoulders of said roof.

6. An adjustable supporting member adapted to be mounted on the roof of a vehicle comprising a pair of brackets and a tension member, said brackets having a curved portion adapted to conform to the contour of the shoulders of said roof and having hook-like extremities adapted to grip the sills of said roof.

7. A supporting member adapted to be mounted on the roof of a vehicle comprising a platform, a plurality of pairs of brackets and a tension member connecting each pair of brackets, said support being maintained in spaced relation to said roof, said brackets having hook-like extremities adapted to grip the sills of said roof.

8. A supporting member adapted to be mounted on the roof of a vehicle comprising a pair of brackets having hook-like extremities and having upwardly extending head members and a tension member between said head members, said hook-like extremities being adapted to grip the sills of said roof.

9. A supporting member adapted to be mounted on the roof of a vehicle comprising a pair of brackets having hook-like extremities and having upwardly extending head members and an adjustable tension member between said head members, said hook-like extremities being adapted to grip the sills of said roof.

10. A shelter adapted to be mounted upon the roof of a vehicle comprising a collapsible enclosure, and a floor for said enclosure secured to a plurality of adjustable supporting members said adjustable supporting members comprising a pair of brackets having hook-like extremities adapted to grip the sills of said roof and a tension member between said brackets.

11. In a device of the class described adapted to be mounted on the roof of a vehicle, a plurality of brackets having hook-like extremities adapted to grip the sills of said roof and having upwardly extending head members and a platform mounted on said brackets and supported by said head members.

12. In a device of the class described adapted to be mounted on the roof of a vehicle, a plurality of pairs of brackets having hook-like extremities adapted to grip the sills of said roof and having upwardly extending head members, and a bar connecting the brackets of a pair.

13. In a device of the class described adapted to be mounted on the roof of a vehicle, a plurality of pairs of brackets each having a hook-like extremity adapted to grip the sills of said roof and having an upwardly extending head member, and an adjustable bar between the brackets of a pair.

14. In a device of the class described adapted to be mounted on the roof of a vehicle, a bracket comprising a hook-like extremity adapted to grip the sill of said roof, an upwardly extending head member and a flexible portion between said hook-like extremity and said head adapted to conform to the contour of the shoulders of said roof.

15. In a device of the class described adapted to be mounted on the roof of a vehicle, a bracket comprising a hook-like extremity adapted to grip the sill of said roof, an upwardly extending head member and a curved portion between said hook-like extremity and said head member conforming to the contour of the shoulders of said roof.

16. A bracket of the class described adapted to be mounted on the roof of a vehicle comprising a hook-like member adapted to grip the sill of said roof, a head member adapted to support a load, and a connecting portion between said hook-like member and said head member adapted to conform to the contour of the shoulders of said roof.

17. A bracket of the class described adapted to be mounted on the roof of a vehicle comprising a hook-like member adapted to grip the sill of said roof, a head member adapted to support a load, and a curved connecting portion between said hook-like member and said head member conforming to the contour of the shoulders of said roof.

RAY C. STRAUSS.